US010581845B2

(12) United States Patent
Gu (10) Patent No.: US 10,581,845 B2
(45) Date of Patent: Mar. 3, 2020

(54) METHOD AND APPARATUS FOR ASSIGNING DEVICE FINGERPRINTS TO INTERNET DEVICES

(71) Applicant: ALIBABA GROUP HOLDING LIMITED, George Town, Grand Cayman (KY)

(72) Inventor: Siyuan Gu, Shanghai (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/014,266

(22) Filed: Feb. 3, 2016

(65) Prior Publication Data

US 2016/0234211 A1 Aug. 11, 2016

(30) Foreign Application Priority Data

Feb. 11, 2015 (CN) .......................... 2015 1 0072290

(51) Int. Cl.
*H04L 29/06* (2006.01)
(52) U.S. Cl.
CPC ........ *H04L 63/0876* (2013.01); *H04L 63/102* (2013.01); *H04L 63/14* (2013.01)
(58) Field of Classification Search
CPC .. H04L 63/0876; H04L 63/102; H04W 12/06; G06F 21/44
See application file for complete search history.

(56) References Cited

U.S. PATENT DOCUMENTS

| 7,555,536 | B2 | 6/2009 | Dodrill et al. |
| 8,275,829 | B2 | 9/2012 | Plamondon |
| 8,438,184 | B1 | 5/2013 | Wang et al. |
| (Continued) | | | |

FOREIGN PATENT DOCUMENTS

| CN | 102710770 A | 10/2012 |
| CN | 103166917 A | 6/2013 |
| WO | WO 2014/203001 A1 | 12/2014 |

OTHER PUBLICATIONS

Boris Danev et al.,"Attacks on Physical-layer Identification," ACM 2010, pp. 89-98. (Year: 2010).*

(Continued)

*Primary Examiner* — Luu T Pham
*Assistant Examiner* — Canh Le
(74) *Attorney, Agent, or Firm* — Finnegan, Henderson, Farabow, Garrett & Dunner, LLP (57) ABSTRACT

A method for assigning a device fingerprint to a target device is provided. The method includes acquiring first attributes of the target device, the first attributes including at least one browser plug-in or one font; calculating a correlation value with respect the first attributes of the target device and second attributes of at least one second device having a device fingerprint stored in a device library. The first attributes correspond to the second attributes. The method further includes: if the correlation value is greater than or equal to a pre-determined threshold value, assigning the device fingerprint of the at least one second device to the target device; and if the correlation value is smaller than the pre-determined threshold value, storing the first attributes of the target device to the device library and assigning a new device fingerprint to the target device.

8 Claims, 4 Drawing Sheets

(56) References Cited

U.S. PATENT DOCUMENTS

| | | | |
|---|---|---|---|
| 8,695,068 B1* | 4/2014 | Etchegoyen | G06F 21/00 345/419 |
| 8,955,067 B2 | 2/2015 | Chermside | |
| 9,165,124 B1* | 10/2015 | Gurevich | G06F 21/30 |
| 9,219,732 B2 | 12/2015 | Baghdasaryan et al. | |
| 9,292,677 B2 | 3/2016 | Ranganathan et al. | |
| 9,306,754 B2 | 4/2016 | Baghdasaryan et al. | |
| 9,306,930 B2 | 4/2016 | Keys et al. | |
| 9,378,359 B2 | 6/2016 | Qureshi et al. | |
| 2004/0254890 A1* | 12/2004 | Sancho | G06Q 20/3674 705/67 |
| 2007/0239569 A1* | 10/2007 | Lucas | G06Q 10/08 705/28 |
| 2012/0084206 A1* | 4/2012 | Mehew | G06Q 40/00 705/44 |
| 2013/0210480 A1* | 8/2013 | Pollington | H04W 88/02 455/550.1 |
| 2014/0007222 A1 | 1/2014 | Qureshi et al. | |
| 2014/0047238 A1* | 2/2014 | Harty | H04L 9/3236 713/168 |
| 2014/0068738 A1* | 3/2014 | Harty | G06F 21/73 726/7 |
| 2014/0115607 A1* | 4/2014 | Pillers | G06F 8/62 719/318 |
| 2016/0117736 A1* | 4/2016 | Dasdan | G06Q 30/0269 705/14.66 |

OTHER PUBLICATIONS

Boris Danev et al.,"On Physical-Layer Identification of Wireless Devices," ACM 2012, pp. 1-29. (Year: 2012).*

PCT International Search Report and Written Opinion dated Apr. 21, 2016, issued in corresponding International Application No. PCT/US16/16276 (8 pages).

Broenink, Ralph; "Using Browser Properties for Fingerprinting Purposes"; 16th Twente Student Conference on IT Jan. 27, 2012, Enschede, The Netherlands, Copyright 2012, University of Twente, Faculty of Electronical Engineering, Mathematics and Computer Science (8 pgs.).

Extended European Search Report issued by the European Patent Office in related International Application No. 16749604.1-1218, pursuant to Rule 62 EPC, the Supplementary European Search Report (Art. 153(7) EPC) and the European Search Opinion; dated Jan. 31, 2018 (7 pgs.).

Eckersley, Peter; "How Unique Is Your Web Browser?"; Electronic Frontier Foundation; M.J. Atallah and N. Hopper (Eds.): PETS 2010, LNCS 6205, pp. 1-18, 2010 (18 pgs).

First Chinese Office Action issued in Chinese Appiication No. CN201510072290.5, dated Dec. 20, 2018, 12 pages.

First Chinese Search Report issued in Chinese Application No. CN201510072290.5, dated Dec. 11, 2018, 1 page.

An Office Action Issued by the Japanese Patent Office in corresponding Japanese Application No. 2017-542149, dated Jul. 8, 2019.

Yamada et al., "Robust Identification of Browser Fingerprint Comparison Using Edit Distance", 2015 IEEE, 2015 10th International Conference on Broadband and Wireless Computing, Communication and Applications (BWCCA), 16 pages.

* cited by examiner

METHOD AND APPARATUS FOR ASSIGNING DEVICE FINGERPRINTS TO INTERNET DEVICES

This application is based upon and claims priority to Chinese Patent Application No. 201510072290.5, filed Feb. 11, 2015, the entire contents of which are incorporated herein by reference.

TECHNICAL FIELD

The present disclosure generally relates to the field of computing devices, and particularly to a method and apparatus for assigning device fingerprints to internet devices.

BACKGROUND

With the use of more and more internet applications, security becomes more and more important because financial losses caused by hackers and frauds have been significant. By associating the device fingerprints with user behaviors, it may be more efficient to crack fraudulent activities over the internet to protect security. For example, after a mobile phone is assigned a device fingerprint, the mobile phone may be associated with corresponding account information, such that when the account information is used to log in on a device having different device fingerprints, the security of the account may be protected by employing various security measures.

SUMMARY

Consistent with embodiments of the present disclosure, there is provided a method for assigning a device fingerprint to a target device. The method includes acquiring first attributes of the target device, the first attributes including at least one browser plug-in or one font; calculating a correlation value with respect to the first attributes of the target device and second attributes of at least one second device having a device fingerprint stored in a device library. The first attributes correspond to the second attributes. The method further includes: if the correlation value is greater than or equal to a pre-determined threshold value, assigning the device fingerprint of the at least one second device to the target device; and if the correlation value is smaller than the pre-determined threshold value, storing the first attributes of the target device to the device library and assigning a new device fingerprint to the target device.

Consistent with embodiments of the present disclosure, there is provided an apparatus for assigning a device fingerprint to a target device. The apparatus includes one or more processors, and a memory device configured to store instructions executable by the one or more processors. The one or more processors are configured to perform: acquiring first attributes of the target device, the first attributes including at least one browser plug-in or one font; calculating a correlation value with respect to the first attributes of the target device and second attributes of at least one second device having a device fingerprint stored in a device library. The first attributes correspond to the second attributes. The one or more processors are further configured to perform: if the correlation value is greater than or equal to a pre-determined threshold value, assigning the device fingerprint of the at least one second device to the target device; and if the correlation value is smaller than the pre-determined threshold value, storing the first attributes of the target device to the device library and assigning a new device fingerprint to the target device.

Consistent with embodiments of the present disclosure, there is provided a non-transitory computer-readable storage medium storing instructions, which, when executed by a computer, causes the computer to perform: acquiring first attributes of the target device, the first attributes including at least one browser plug-in or one font; calculating a correlation value with respect to the first attributes of the target device and second attributes of at least one second device having a device fingerprint stored in a device library. The first attributes correspond to the second attributes. The computer is further configured to perform: if the correlation value is greater than or equal to a pre-determined threshold value, assigning the device fingerprint of the at least one second device to the target device; and if the correlation value is smaller than the pre-determined threshold value, storing the first attributes of the target device to the device library and assigning a new device fingerprint to the target device.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Generally, a device fingerprint is a device value determined by the following steps: (1) obtaining attribute values corresponding to a plurality of attributes of the device, for example, an operating system version, a number of CPU cores, and a primary operation frequency, (2) matching the attribute values with attribute values in a device library storing sets of attribute values, and (3) determining a device identification corresponding to the device therein.

Figure 1A:
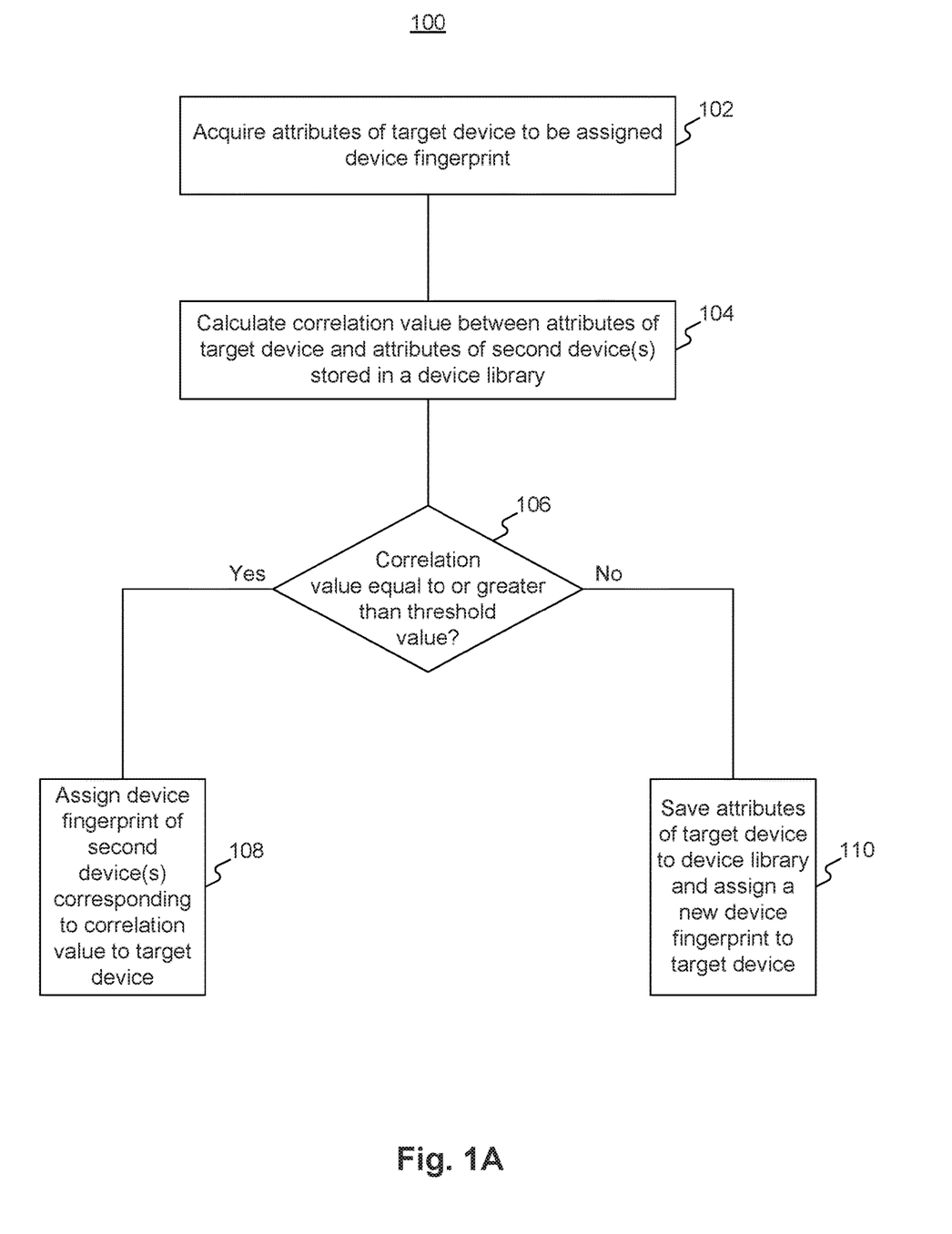
FIG. 1A is a flow chart of an exemplary method for assigning a device fingerprint to an internet device, consistent with the embodiments of this disclosure.

FIG. 1A shows a flow chart of a method 100 for assigning a device fingerprint to an internet device, consistent with the embodiments of this disclosure. An internet device may be a mobile phone, a smart phone, a tablet, a laptop computer, a desktop computer, or any other electronic devices that can connect to the internet. Method 100 may be performed by a server device connected to the internet. As shown in FIG. 1A, method 100 may include the following steps.

In step 102, attributes of a target internet device to be assigned a device fingerprint are acquired. The attributes of the target device include at least browser plug-ins and installed on the target device. In some other embodiments, the attributes include font types.

In step 104, correlation values with respect to the attributes of the target device and attributes of one or more second devices stored in a device library are calculated. In some embodiments, the device library stores at least one set of attributes of a second device that has been assigned a device fingerprint. Correlation values are calculated between the attributes of the target device and attributes of each of second devices stored in the device library. For example, correlation values of the browser plug-ins and/or font types of the target device and browser plug-ins and/or font types of each of the second devices are calculated. One correlation value can be obtained between attributes of the target device and attributes of a second device. When there are multiple second devices in the device library, a number of correlation values corresponding to the number of the second devices can be calculated and obtained. In some embodiments, sequence and category of the attributes of the target device correspond to the sequence and category of the attributes of the second device in order to calculate the correlation values. For example, if the sequence and category of the attributes of the target device are: [plug-in I], [plug-in II], and [font I], then a correlation value may be calculated if the sequence and category of the attributes of the second device are: [plug-in I'], [plug-in II'], and [font I'] as well.

In step 106, the largest correlation value obtained in step 104 is selected and compared with a pre-determined threshold value. In some embodiments, each of the correlation values obtained in step 104 may be compared with the pre-determined threshold value, without having to select the largest correlation value.

If the largest correlation value is equal to or greater than the pre-determined threshold value, in step 108, the device fingerprint of the second device corresponding to the largest correlation value is assigned to the target device. If the largest correlation value is smaller than the pre-determined threshold value, in step 110, the attributes of the target device including its browser plug-ins and font types are saved in the device library and a new device fingerprint is assigned to the target device. The new device fingerprint may include, for example, a device identification of the target device.

For example, the target device may be a personal computer (PC). The PC may have several browsers installed therein. For example, Google Chrome may be installed in the PC. At least one plug-in is installed on the browser, and the browser also has at least one font type. The plug-in and/or font on the browser may be obtained by a server device to generate a list of browser plug-ins and/or font types of the PC.

In some embodiments, a device library may be stored in a server device so that device fingerprints can be assigned to target devices by method 100 as described above. The device library stores at least one browser plug-in and/or font type of a second device. The browser plug-ins and/or font types of the target device can be compared with each of the browser plug-ins and the font types of each of second devices in the device library to calculate at least one correlation value. The details of calculating the correlation values will be described below.

Figure 1B:
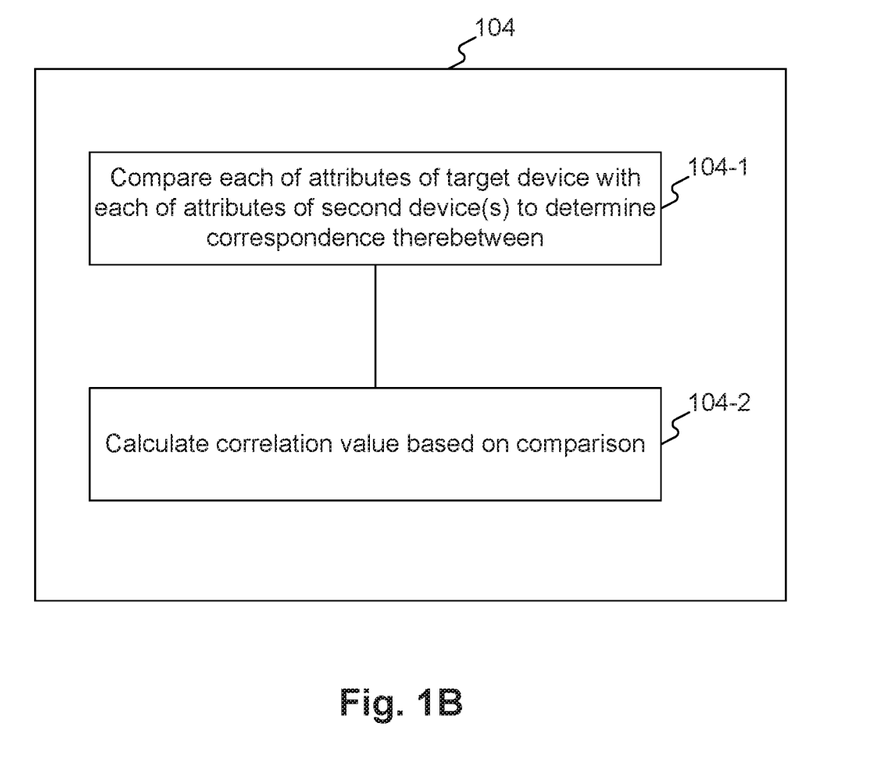
FIG. 1B show a flow char of calculating correlation values consistent with the embodiments of this disclosure.

FIG. 1B shows a flow chart of calculating correlation values in step 104. In step 104-1, each of the attributes of the target device is compared with each of the attributes of the second device stored in the device library to determine the correspondence there between. In step 104-2, the correlation values are calculated based on the comparison. After acquiring browser plug-ins and/or font types of the target device, they are compared with each of the browser plug-ins and the font types of each of second devices in the device library. The correlation values may be obtained from the comparison results.

For example, the browser plug-ins and/or font types of the target device is expressed as a list $I=[I_1, I_2, \ldots, I_M]$, where $I_i$ is an item of the attributes, e.g., a plug-in or a font type, and M is an integer equal to or greater than one. A list of browser plug-ins and/or font types of each of the second devices stored in the device library can be expressed as $I'=[I_{1'}, I_{2'}, \ldots, I_{M'}]$. In some embodiments, the browser plug-in and/or font list I of the target device have the same sequence and category as those of items list I' of a second device stored in the device library, but the attribute values may be different. For example, although a browser plug-in and/or font type of the target device, e.g., $I_2$, is not installed in the target device, $I_2$ is still kept in list I and assigned a value to show it is not installed so that list I can include an item corresponding to item $I_{2'}$ of list I' to facilitate the comparison.

Moreover, $I_1$ and the $I_{1'}$ correspond to each other as plug-ins or font types. That is, their attributes are the same but their values may be different. $I_{1'}$ is compared with $I_1$ to determine whether they have the same attribute, for example, whether they are both of a plug-in or a font. Depending on the comparison result, a comparison value is given to represent the degree of their correlation. The comparison process will continue until all of the items in the lists are compared. Each comparison of items will be given a comparison value. In some embodiments, a correlation value may be obtained by adding all of the comparison values.

Figure 2:
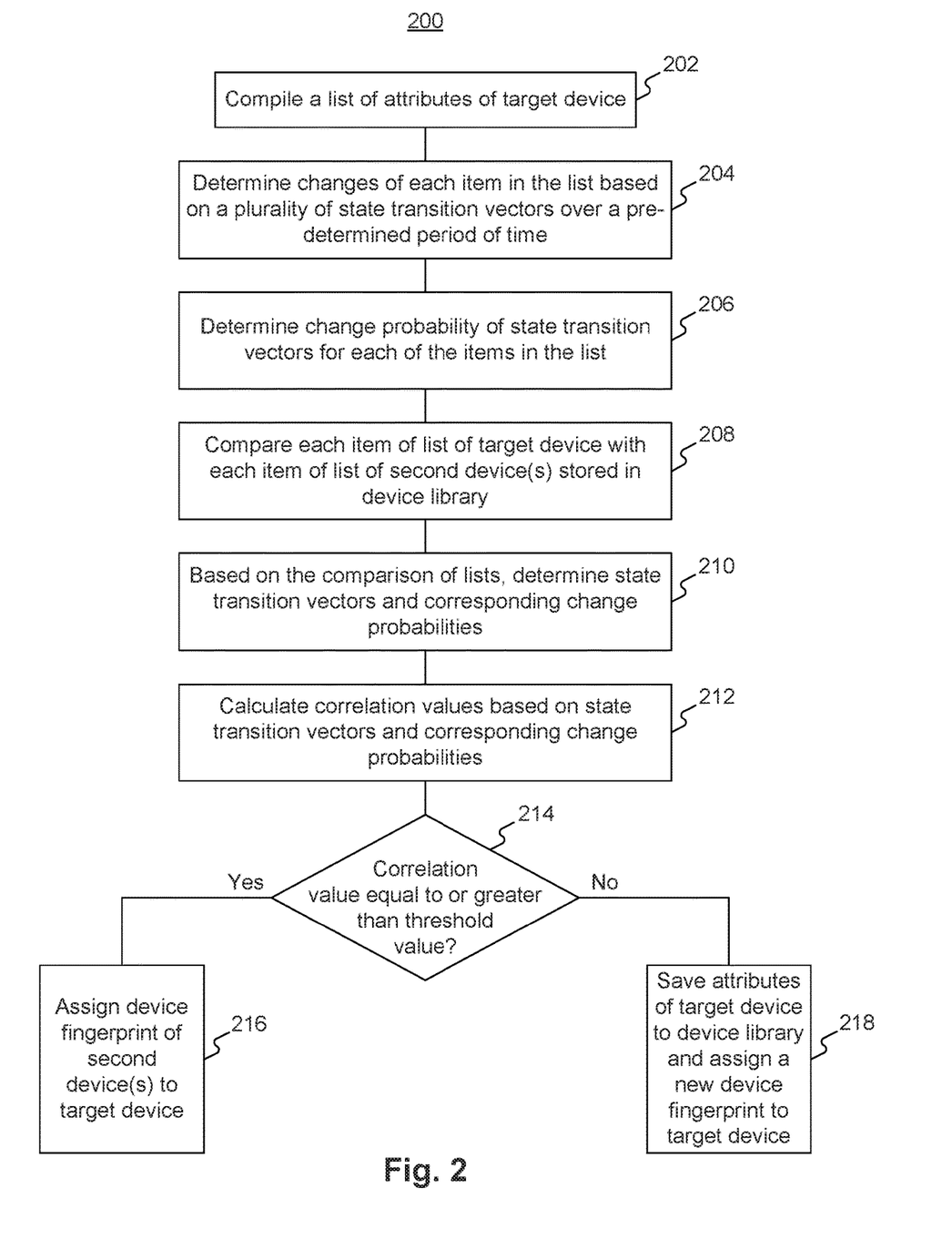
FIG. 2 is a flow chart of an exemplary method for assigning a device fingerprint to an internet device, consistent with the embodiments of this disclosure.

The present disclosure also contemplates that the attribute values of browser plug-ins and font types may be changed. In some embodiments, the calculation of correlation values may need to consider a change probability of those attribute values. FIG. 2 shows a flow chart of a method 200 for assigning a device fingerprint to an internet device that takes the changes of the attribute values into consideration when calculating correlation values, consistent with embodiments of the present disclosure. An internet device may be a mobile phone, a smart phone, a tablet, a laptop computer, a desktop computer, or any other electronic devices that can connect to the internet. Method 200 may be performed by a server device connected to the internet.

Referring to FIG. 2, method 200 includes the following steps. In step 202, a list of attributes of a target device to be assigned a device fingerprint is compiled. The attributes of the target device may include at least browser plug-ins and/or font types of the target device. For example, a server device may compile a list I of attributes including browser plug-ins and/or font types of the target device, where $I=[I_1, I_2, \ldots, I_M]$, M being an integer equal to or greater than one. In some embodiments, list I may include M items of plug-ins and/or font types, some of which are commonly used in a browser.

In Step 204, changes of each of the items (attributes) in the list are determined based on a plurality of state transition vectors over a period of time. For example, when the items in the list are browser plug-ins and/or fonts, the state transition vectors for these items may be installed, uninstalled, never installed, no change after installation, upgrade, or degrade. In some embodiments, the changes in state transition vectors of the items in the list are determined by observing the changes of a pre-determined number, e.g., one thousand, of sample devices, over a pre-determined period of time, e.g., one day.

In step 206, a change probability of the state transition vectors for each of the items in the list is determined. For example, in the illustrated embodiment above, one thousand sample devices are monitored to determine the change of each item $I_1, I_2, \ldots, I_M$ of list I. For example, the state of each of the items $I_1, I_2, \ldots, I_M$ changed to "installed" within a pre-determined time period, e.g., one day, is monitored. Similarly, the state of each of the items $I_1, I_2, \ldots, I_M$ changed to "uninstalled," "never installed," "no change after installation," "upgrade," or "degrade" within a pre-determined time period may be monitored. The change probability is determined by the monitored data. For example, with respect to item $I_1$, which may be a plug-in or font, if the plug-in or font was uninstalled in nine hundred sample devices out of one thousand over a period of one day, at the end of the period the change probability for the state transition vector "uninstalled" may be determined to be 90%.

In step 208, each item, i.e., an attribute, of the list I of the target device is compared with each item of a list of a second device, which is stored in a device library. For example, the device library stores at least one set of attributes of a second device that has been assigned a device fingerprint. The attributes, $I_{1'}, I_{2'}, \ldots, I_{M'}$, of the second device may be complied as a list $I'=[I_{1'}, I_{2'}, \ldots, I_{M'}]$. Each of items $I_1, I_2, \ldots, I_M$ of list I is compared with a corresponding item $I_{1'}, I_{2'}, \ldots, I_{M'}$ of list I'.

In step 210, based on the comparison of lists in step 208, state transition vectors and corresponding change probabilities are determined. In the illustrated embodiment above, item $I_1$ is compared with corresponding $I_{1'}$. If the state of $I_1$ indicates that a plug-in or font is installed in the browser of the target device and the state of $I_{1'}$ indicates that the plug-in or font is not installed in the browser of the second device, the state transition vector from $I_1$ to $I_{1'}$ may be determined to be "uninstall." The change probability 90% of "uninstalled" as illustrated in step 206 may then be utilized. The comparison of $I_1, I_2, \ldots, I_M$ with $I_{1'}, \ldots, I_{2'}, \ldots, I_{M'}$ results in M numbers of change probabilities for state transition vectors.

In step 212, a correlation value of list I of the target device and list I' of the second device is calculated based on state transition vectors and their corresponding change probability. For example, in the above illustrated embodiment, comparing $I_1, I_2, \ldots, I_M$ with $I_{1'}, I_{2'}, \ldots, I_{M'}$ results in M numbers of state transition vectors and their corresponding change probabilities. In some embodiments, a correlation value for list I and list I' may be obtained by adding each of the change probabilities. If $P_{match}$ represents a correlation value, it can be obtained through the following function:

$$P_{match} = \sum_{i=1}^{M} \log(P_{i,j}); i \in [1, M], j \in [1, K],$$

wherein M represents the number of the attributes, e.g., browser plug-ins and/or font lists, and K represents the number of the state transition vectors.

When there are n numbers of second devices stored in the device library, the comparison between the target device and each of the second devices may results in n numbers of correlation values.

In step 214, the largest correlation value obtained in step 212 is selected and compared with a pre-determined threshold value. In some embodiments, each of the correlation values obtained in step 212 may be compared with the pre-determined threshold value, without having to select the largest correlation value.

If the largest correlation value is equal to or greater than the pre-determined threshold value, in step 216, the device fingerprint of the second device corresponding to the largest correlation value is assigned to the target device. If the largest correlation value is smaller than the pre-determined threshold value, in step 218, the attributes of the target device including its browser plug-ins and font types are saved in the device library and a new device fingerprint is assigned to the target device. The new device fingerprint may include, for example, a device identification of the target device.

Figure 3:
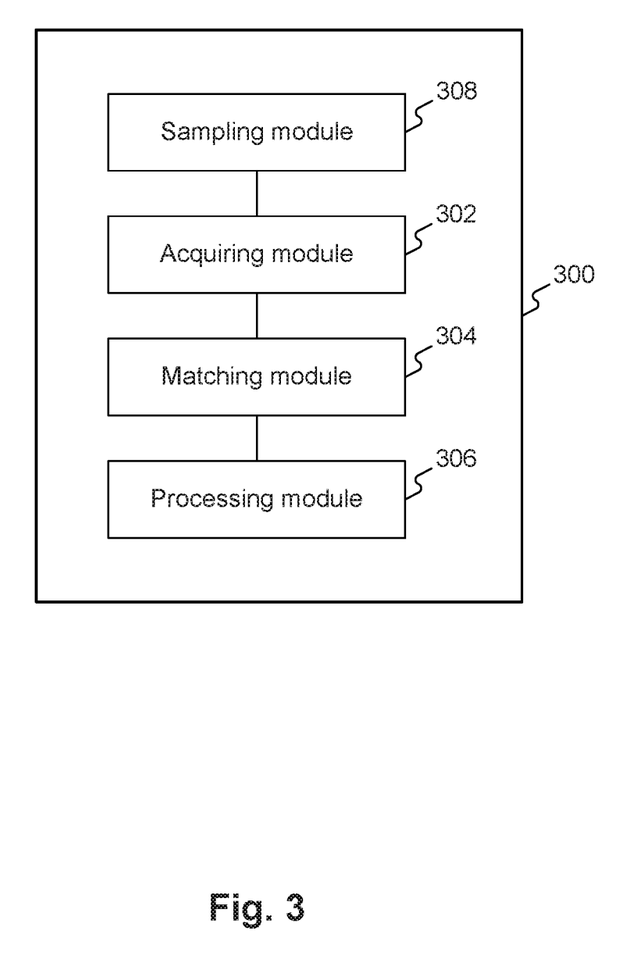
FIG. 3 shows an exemplary apparatus 300 for assigning device fingerprints to target devices, consistent with embodiments of the present disclosure.

FIG. 3 shows an apparatus 300 for assigning device fingerprints to target devices, consistent with embodiments of the present disclosure. Apparatus 300 may be a server device that includes one or more processors and a memory device storing instructions executable by the one or more processors. Referring to FIG. 3, apparatus 300 includes an acquiring module 302, a matching module 304, and a processing module 306.

Acquiring module 302 is configured to acquire attributes including a browser plug-in and/or font list of a target device to be assigned a device fingerprint. Matching module 304 is configured to calculate a correlation value of the attributes of the target device with respect to attributes of at least one second device having a device fingerprint stored in a device library. In some embodiments, to calculate the correlation value, each of the attributes of the target device has a corresponding attribute of the at least one second device.

Processing module 306 is configured to assign a device fingerprint to the target device based on the calculated correlation values. In some embodiments, processing module 306 compares the correlation value with a pre-determined threshold value. If the correlation value is greater than or equal to a pre-determined threshold value, processing module assigns the device fingerprint of the second device corresponding to the correlation value to the target device. If the correlation value is smaller than the pre-determined threshold value, processing module saves the attributes of the target device to the device library and assigns a new device fingerprint to the target device.

In some embodiments, apparatus 300 may further include a sampling module 308. Sample module 308 is configured to acquire a list of attributes including browser plug-ins and/or font types of a target device to be assigned a device fingerprint; determine the changes of each item in the lists of a plurality of sample devices over a pre-determined period of time based on a plurality of state transition vectors; and calculate a change probability of each item in the list corresponding to each state transition vector.

Persons skilled in the art can understand that, for convenience and brevity of the description, the specific processes performed by apparatus 300 and its modules 302, 304, 306, 308 have been described in methods 100 and 200 shown in FIGS. 1A and 2 and related descriptions, and are not described again here. For example, referring to FIGS. 1A, 2, and 3, acquiring module 302 may be configured to perform steps 102 and 202; matching module 304 may be configured to perform steps 104 and 212; processing module 306 may be configured to perform steps 106, 108, 110, 214, 216, and 218; and sampling module 308 may be configured to perform steps 204, 206, 208, and 210.

In the embodiments provided in the present disclosure, it shall be understood that the disclosed apparatus and methods may be implemented in some other ways. For example, the apparatus embodiments described above are only schematic. The above modules are described by their functional divisions, while in practical implementation, a plurality of modules or components can be combined or integrated into another apparatus, or some features can be omitted or are not implemented. Further, each of the modules may be directly or indirectly coupled to each other through certain interfaces. The coupling or communication of apparatus or modules may be electrical, mechanical or in other forms.

The illustrated modules as separated component may or may not be physically separated. A module may be located at a place or it can also be distributed as multiple network modules. All or part of the modules therein can be selected according to the actual needs to realize the illustrated embodiment.

In some embodiments, various modules consistent with the embodiments of the present disclosure can be integrated into one processing module, or they can also be modules independently and physically existing, or they can be integrated into a module using two or more sub-modules. The above-mentioned integrated module can be achieved by means of hardware, or a combination of hardware and software.

The illustrated modules may be achieved by means of software function module stored in a computer readable storage medium, executable by one or more physical processors. The software function module may be stored in a storage medium, including instructions causing a computer device (such as a personal computer, a server, or a network device) or a processor to perform some of the steps of the methods described in various embodiments of the present disclosure. Moreover, the storage medium may include various non-transitory media that can store program codes, such as a USB disk, a mobile hard drive, a Read-Only Memory (ROM), a Random Access Memory (RAM), a magnetic disc or optical disc.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for assigning a device fingerprint to a target device, comprising:
   acquiring first attributes of the target device, the first attributes including information regarding at least one browser plug-in in the target device;
   calculating a correlation value with respect to the first attributes of the target device and second attributes of at least one second device having a device fingerprint stored in a device library, the first attributes corresponding to the second attributes, wherein the calculation of the correlation values comprises:
      determining a first state transition vector and a second state transition vector for a first item and a second item of the first attributes from a corresponding first item and a corresponding second item of the second attributes based on a plurality of state transition vectors over a period of time, wherein the first state transition vector and the second state transition vector include one or more of installation, uninstallation, never uninstalled, no change after installation, upgrade, or downgrade,
      determining a first change probability of the first state transition vector and a second change probability of the second state transition vector based on monitoring data of sample devices, and
      calculating the correlation value based on a sum of the first change probability and the second change probability; and
   assigning the device fingerprint of the at least one second device to the target device in response to the correlation value being greater than or equal to a pre-determined threshold value; or
   storing the first attributes of the target device to the device library and assigning a new device fingerprint to the target device in response to the correlation value being smaller than the pre-determined threshold value.

2. The method according to claim 1, wherein the new device fingerprint includes a device identification of the target device.

3. The method according to claim 1, wherein the information includes an installation state of each of the at least one browser plug-in in the target device.

4. An apparatus for assigning a device fingerprint to a target device, comprising:
   one or more processors; and
   a memory device configured to store instructions executable by the one or more processors,
   wherein the one or more processors are configured to execute the instructions to cause the apparatus to:
   acquire first attributes of the target device, the first attributes including information regarding at least one browser plug-in in the target device;
   calculate a correlation value with respect to the first attributes of the target device and second attributes of at least one second device having a device fingerprint stored in a device library, the first attributes corresponding to the second attributes, wherein the calculation of the correlation values comprises:
      determining a first state transition vector and a second state transition vector for a first item and a second item of the first attributes from a corresponding first item and a corresponding second item of the second attributes based on a plurality of state transition vectors over a period of time, wherein the first state transition vector and the second state transition vector include one or more of installation, uninstallation, never uninstalled, no change after installation, upgrade, or downgrade,
      determining a first change probability of the first state transition vector and a second change probability of the second state transition vector based on monitoring data of sample devices, and calculating the correlation value based on a sum of the first change probability and the second change probability; and assign the device fingerprint of the at least one second device to the target device if the correlation value is greater than or equal to a pre-determined threshold value; or store the first attributes of the target device to the device library and assign a new device fingerprint to the target device if the correlation value is smaller than the pre-determined threshold value.

5. The apparatus according to claim 4, wherein the new device fingerprint includes a device identification of the target device.

6. The apparatus according to claim 4, wherein the information includes an installation state of each of the at least one browser plug-in in the target device.

7. A non-transitory computer-readable storage medium storing instructions that are executable by one or more processors of a computer to cause the computer to perform a method for assigning a device fingerprint to a target device, comprising:

acquiring first attributes of the target device, the first attributes including information regarding at least one browser plug-in in the target device;

calculating a correlation value with respect to the first attributes of the target device and second attributes of at least one second device having a device fingerprint stored in a device library, the first attributes corresponding to the second attributes, wherein the calculation of the correlation values comprises:

determining a first state transition vector and a second state transition vector for a first item and a second item of the first attributes from a corresponding first item and a corresponding second item of the second attributes based on a plurality of state transition vectors over a period of time, wherein the first state transition vector and the second state transition vector include one or more of installation, uninstallation, never uninstalled, no change after installation, upgrade, or downgrade, determining a first change probability of the first state transition vector and a second change probability of the second state transition vector based on monitoring data of sample devices, and calculating the correlation value based on a sum of the first change probability and the second change probability; and assigning the device fingerprint of the at least one second device to the target device if the correlation value is greater than or equal to a pre-determined threshold value; or storing the first attributes of the target device to the device library and assigning a new device fingerprint to the target device if the correlation value is smaller than the pre-determined threshold value.

8. The non-transitory computer-readable storage medium according to claim 7, wherein the new device fingerprint includes a device identification of the target device.

* * * * *

UNITED STATES PATENT AND TRADEMARK OFFICE
CERTIFICATE OF CORRECTION

| | |
|---|---|
| PATENT NO. | : 10,581,845 B2 |
| APPLICATION NO. | : 15/014266 |
| DATED | : March 3, 2020 |
| INVENTOR(S) | : Siyuan Gu |

It is certified that error appears in the above-identified patent and that said Letters Patent is hereby corrected as shown below:

On the Title Page

Item (30) Foreign Application Priority Data, "2015 1 0072290" should read as --2015 1 0072290.5--.

Signed and Sealed this
Sixth Day of September, 2022

Katherine Kelly Vidal
*Director of the United States Patent and Trademark Office*